(12) United States Patent
Rhee et al.

(10) Patent No.: US 6,804,790 B2
(45) Date of Patent: Oct. 12, 2004

(54) COORDINATING PROTOCOL FOR A MULTI-PROCESSOR SYSTEM

(75) Inventors: Sokwoo Rhee, Somerville, MA (US); Sheng Liu, Cambridge, MA (US)

(73) Assignee: Millennial Net, Burlington, MA (US)

( * ) Notice: Subject to any disclaimer, the term of this patent is extended or adjusted under 35 U.S.C. 154(b) by 112 days.

(21) Appl. No.: 09/999,098

(22) Filed: Oct. 31, 2001

(65) Prior Publication Data

US 2002/0091954 A1 Jul. 11, 2002

Related U.S. Application Data

(60) Provisional application No. 60/244,502, filed on Oct. 31, 2000.

(51) Int. Cl.[7] .............................. G06F 1/26; G06F 1/28; G06F 1/30; G06F 1/32
(52) U.S. Cl. ..................... 713/320; 713/300; 713/322; 713/323; 713/324
(58) Field of Search .................. 713/300, 320, 713/322, 323, 324, 330, 340, 310; 709/200, 201, 208, 209, 210, 211; 712/28, 29, 30, 31, 32, 34; 714/100, 2, 10, 11, 12, 13

(56) References Cited

U.S. PATENT DOCUMENTS

| | | | |
|---|---|---|---|
| 4,358,823 A | | 11/1982 | McDonald et al. |
| 5,128,928 A | * | 7/1992 | Wilder et al. ............ 370/263 |
| 5,194,860 A | | 3/1993 | Jones et al. |
| 5,257,372 A | | 10/1993 | Furtney et al. |
| 5,491,787 A | * | 2/1996 | Hashemi ................. 714/11 |
| 5,790,817 A | | 8/1998 | Asghar et al. |
| 5,809,222 A | * | 9/1998 | Kizu et al. ............... 714/4 |
| 6,272,537 B1 | | 8/2001 | Kekic et al. |
| 6,275,477 B1 | * | 8/2001 | Trompower et al. ....... 370/313 |
| 6,502,206 B1 | * | 12/2002 | Kosuge et al. ............ 714/13 |

FOREIGN PATENT DOCUMENTS

JP          57089169 A     *   6/1982    ............ G06F/15/16

OTHER PUBLICATIONS

Rosenberg, Jerry M.; Dictionary of Computers, Information Processing, and Telecommunications; 1987, John Wiley & Sons, Inc.; 2nd Edition, page(s): 229.*

Greenberg, A.G.; Wright, P.E., "Design and analysis of master/slave multiprocessors", Computers, IEEE Transactions on, vol.: 40 Issue: 8, Aug. 1991, Page(s): 963–976.*

* cited by examiner

Primary Examiner—Lynne H. Browne
Assistant Examiner—James K. Trujillo
(74) Attorney, Agent, or Firm—Fish & Richardson P.C.

(57) ABSTRACT

A multi-processor computing system included a plurality of processing units is provided in which each of the plurality of processing units operates at clock frequency and a coordinating protocol is used to assign tasks and operations to any of the plurality of processing units in a manner such that the power efficiency of the system is optimized.

50 Claims, 6 Drawing Sheets

Transfer of watchdog duty among PUs.

COORDINATING PROTOCOL FOR A MULTI-PROCESSOR SYSTEM

RELATED APPLICATIONS

This application claims priority of U.S. Provisional Application Ser. No. 60/244,502 filed Oct. 31, 2000 and entitled I-BEAN: AN INTEGRATED WIRELESS COMMUNICATION AND COMPUTING DEVICE USING NOVEL POWER SAVING ALGORIGHMS FOR MINIMAL ENERGY OPERATIONS.

FIELD OF THE INVENTION

This invention relates to a networked processing system with an optimized power efficiency.

BACKGROUND OF THE INVENTION

Power efficiency and minimizing power usage are important issues in networked systems, such as communications systems and computing systems. Programs which monitor the usage of various components of a computer system and shut down or minimize some of those components have been used in the past.

However, one area in which such power conservation has not been utilized is with respect to processing units. Whether in networked computer systems or communications systems, optimizing the power efficiency of processing units has not been previously addressed. For example, computer systems with multiple processors operate all processors in parallel at the same time to improve overall system performance without consideration to the power usage involved.

In multiple processor systems, specific tasks such as disk operations, display operations and keyboard input may be assigned to each processor. Another method of improving performance is to assign specific programs, such as word processing and spreadsheet programs, to separate processors. What these systems fail to address is the power used when the processor units are idling. Even when idling, processors are using power with every tick of the processor clock. For high speed processors, this can result in a substantial power usage.

This problem is particularly evident in portable units where the power is limited to that which is available from batteries. One solution used in laptop computers is to slow the processor speed when the laptop computer is running on battery. For example, a processor chip may operate at 1 GHz when the computer is connected to an AC power outlet and at 500 MHz when running on the internal battery. This results in a significant impact on the performance of the system.

Likewise, communications systems such as cellular phones experience considerable idle time during which power continues to be used in order to keep the system ready to transmit or receive signals. This use of power even when idling causes portable, battery-powered units to require frequent recharging.

SUMMARY OF THE INVENTION

It is therefore an object of this invention to provide a networked processing system in which power usage is minimized.

It is a further object of this invention to provide a networked processing system in which performance is optimized.

It is a further object of this invention to provide a multi-tasking, multiple processor system in which the power efficiency is optimized.

It is a further object of this invention to provide a self-contained, miniaturized computer with a built in power source, flash memory, digital I/O interface and radio frequency (RF) transceiver for bi-directional communication.

The invention results from the realization that, in a multi-tasking, multi-processor environment, the power efficiency of the system can be optimized by coordinating the usage of processing units such that tasks are run on the appropriate speed processing unit and unused processing units are placed in sleep mode.

This invention features a networked computing system with improved power consumption comprising a plurality of processing units including at least first and second processing units. A coordinating protocol is operative on the first and second processing units and controls the operation of the system such that the power consumption of the system is minimized.

In a preferred embodiment, the first and second processing units are interconnected. The first processing unit operates at a first clock frequency, and the second processing unit operates at a second clock frequency. The first clock frequency may be lower than the second clock frequency.

The first processing unit assigns a task to the first or second processing units based on the clock frequency required to run the task such that the minimum power is used. The first processing unit may instruct the second processing unit to enter a minimum power usage mode. The first processing may activate the second processing unit from the minimum power usage mode when a task is to performed by the second processing unit. The first processing unit may transfer the coordinating protocol to the second processing unit.

The processing units may be communications device which may be bi-directional communications devices. The first processing unit may instruct the second processing unit to enter a minimum power usage mode for a preprogrammed time. The second processing unit may poll the first processing unit after the preprogrammed time. The preprogrammed time may be variable.

This inventions also provides a multiple processor computer system comprising a plurality of processing units, each of the plurality of processing units operating at a clock frequency. A first processing unit operates at a clock frequency lower than the remaining processing units. A coordinating protocol is operable on the first processing unit and coordinates the operation of the system such that the power efficiency is optimized.

In a preferred embodiment, each of the plurality of processing units operates at a different clock frequency. The first processing unit may transfer the coordinating protocol to a second processing unit of the plurality of processing units. The second processing unit may transfer the coordinating protocol to any of the plurality of processing units.

This invention also features a wireless communication system comprising a base unit and a plurality of terminal units in communication with the base unit. Each of the plurality of terminal units has a duty cycle. The base unit controls the duty cycle of each of the plurality of terminal units to optimize the power efficiency of the system.

In a preferred embodiment, the base unit may instruct at least one of the terminal units to enter a minimum power consumption mode for a preprogrammed time. The base unit and the plurality of terminal units may be bi-directional. The terminal unit may poll the base unit after the preprogrammed time.

This invention also features a method for optimizing the power efficiency of a multi-processor computer system including the steps of providing a plurality of processing units including at least first and second processing units, each processing unit operating at a clock frequency, and operating a coordinating protocol on the first processing unit. The coordinating protocol is operative to receive a request to perform a task, determine to which of the processing units to assign the task, and assign the task to one of the plurality of processing units. The coordinating protocol determines which processing unit to which a task is to be assigned based on optimizing the power efficiency of the system.

The method may also include the steps of transferring the coordinating protocol from the first processing unit to the second processing unit based on the speed required to run the coordinating protocol. The coordinating protocol may be further transferred from the second processing unit to any of the plurality of processing units based on the speed required to run the coordinating protocol.

This invention also features a self-contained, miniaturized computer system including first and second processing units, the first processing unit including a coordinating protocol operable to coordinate the operation of the first and second processing units, a power source, a flash memory module and a RF transceiver, wherein the coordinating protocol assigns tasks to the first and second processing units to optimize the power efficiency of the system.

In a preferred embodiment, the first processing unit operates at a clock frequency of 32 kHz and the second processing unit operates at a clock frequency of 4 MHz. The power source may be a battery.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
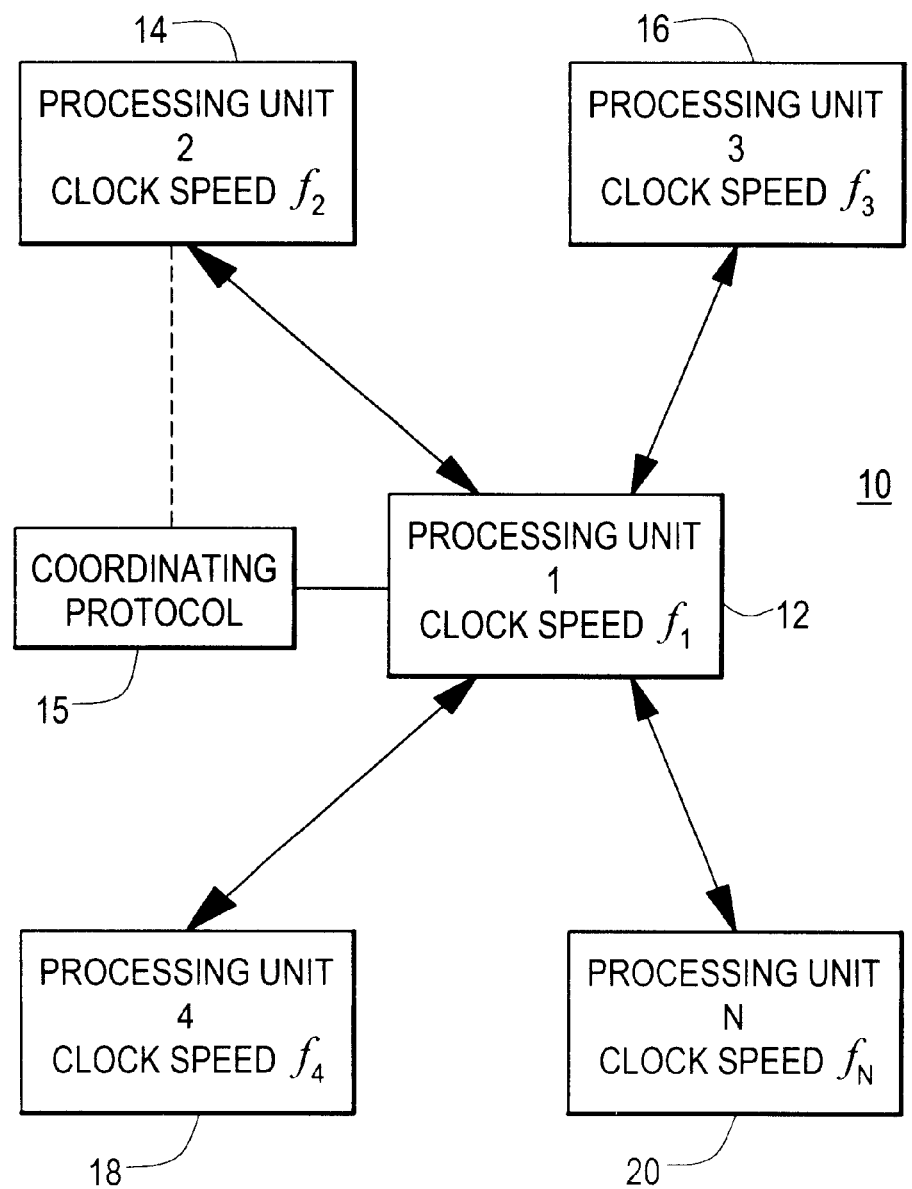
FIG. 1 is a schematic diagram of a networked processing system according to the subject invention.

Networked processing system 10, FIG. 1, includes a number of interconnected processing units 12, 14, 16, 18, and 20. There should be at least two interconnected processing units, and there may be any number N of these processing units in system 10. Each processing unit operates at a given clock frequency, $f_1$, $f_2$, $f_3$, $f_4$, ... $f_N$, respectively. The clock frequencies may all be the same, one or more of the clock frequencies may be the same, or all of the clock frequencies may be different. In a preferred embodiment, each processing unit operates at a different clock frequency, with $f_1 < f_2 < f_3 < f_4 < \ldots f_N$.

Processing units 12, 14, 16, 18 and 20 may be central processing units (CPUs) used in many desktop and portable computers today. These processing units may be networked externally, i.e., one or more processing unit may be located in a separate enclosure, or they may be networked internally, i.e., the processing units may be located on a single circuit board or interconnected via an internal data bus in the same computer enclosure.

In operation, processing unit 12 includes a coordinating protocol 15 which is used to control the operation of system 10 by assigning tasks and operations to various processing units based upon the speed required to perform a given task of function. Coordinating protocol 15 is designed to assign tasks to the various processing units with the result being the optimization of the power efficiency of system 10.

For example, the coordinating protocol will allow processing unit 12 to assign a given task or operation to itself or to any other processing unit 14, 16, 18 or 20 based upon the speed requirements of the task or operation and the clock frequencies of the various processing units. Tasks and operations which require lower clock frequencies, which may include such tasks as refreshing a display or operations such as processing keyboard entries, will be assigned to processing units with lower clock frequencies. Because those processing units operate at lower clock frequencies, the power efficiency of the system as a whole will be optimized. When the task load of the system is low enough, processing units may even be shut off or placed into a "sleep" mode to further optimize the power efficiency of the system. One processing unit will always need to remain active to run the coordinating protocol so it may reactivate any processing units which have been shut down.

Figure 3:
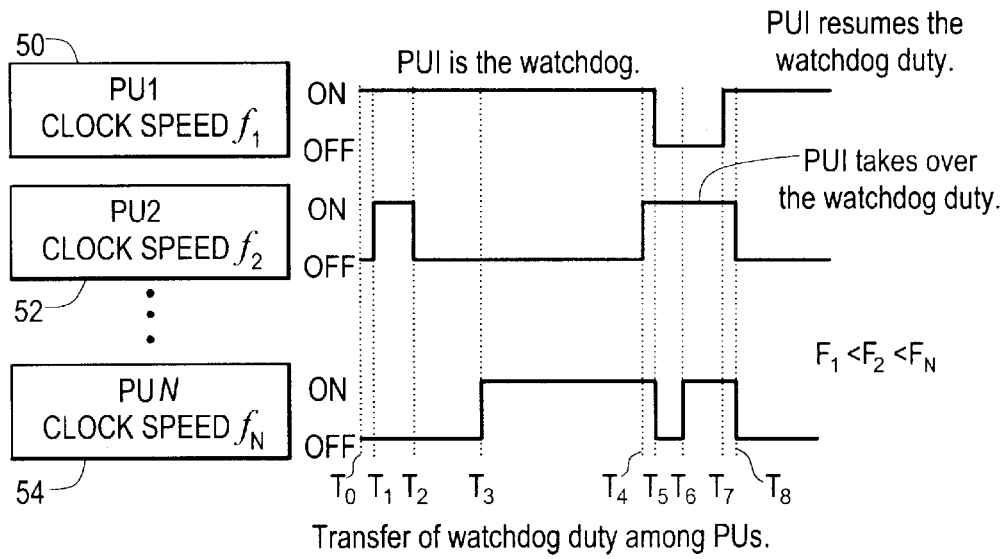
FIG. 3 is a timing diagram illustrating the transfer of the coordinating protocol among processing units according to the subject invention.

In a preferred embodiment, the coordinating protocol may be transferred from one processing unit to another processing unit. As shown in FIG. 3, there are N processing units 50, 52, 54, each operating at a respective clock frequency of $f_1$, $f_2$, ... $f_N$, with $f_1 < f_s < \ldots f_N$. Processing unit 50 is the "watchdog", i.e., the processing unit that runs the coordinating protocol, from time $T_0$ to time $T_4$. During that period, processing unit 50 activates processing unit 52 at time $T_1$, deactivates processing unit 52 at time $T_2$, and activates processing unit 54 at time $T_3$. At time $T_4$, processing unit 50 activates processing unit 52 and transfers the coordinating protocol to processing unit 52 which then becomes the "watchdog." Processing unit 52 deactivates processing units 50 and 54 at time $T_5$, reactivates processing unit 54 at time $T_6$, and reactivates processing unit 50 at time $T_7$. Processing unit 52 transfers the coordinating protocol back to processing unit 50 time at $T_7$, whereby processing unit 50 resumes the "watchdog" responsibility. Finally, processing unit 50 deactivates processing units 52 and 54 at time $T_8$.

Transferring the coordinating protocol between processing units is useful when the coordinating protocol itself requires a higher clock frequency than that of the lowest clock frequency available. For example, if the number of tasks requested is high enough, the coordinating protocol may require a clock frequency higher than that of the lowest clock frequency available to efficiently and effectively handle the assignment of the tasks to various processing units. Normally, the power efficiency is generally optimized when the coordinating protocol is run by the processing unit with the lowest clock frequency as this processing unit uses the minimum power when idling due to the low clock frequency.

One application of a computing system where this invention is particularly useful is laptop, or other portable, computers. By using multiple processing units in a laptop combined with the coordinating protocol of this invention, it is possible to optimize the power consumption of the laptop computer such that the battery life is maximized.

Figure 2:
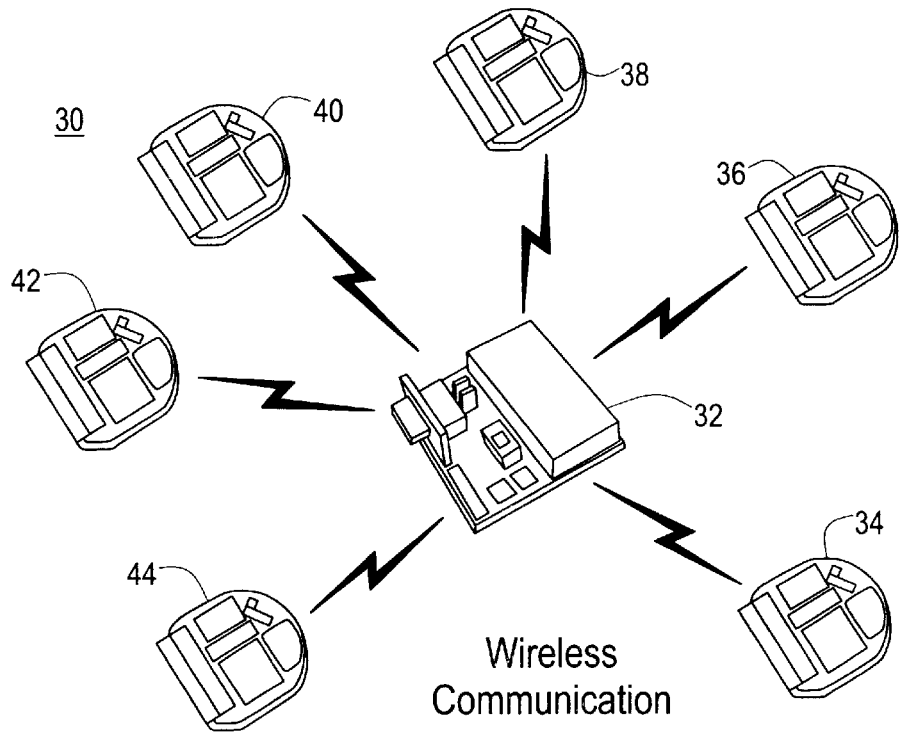
FIG. 2 is a block diagram of a bi-directional wireless communication system according to the subject invention.

In another embodiment, communications system 30, FIG. 2, includes base station 32 and at least one portable communications device 34. System 30 may include a plurality of M portable communications devices 34, 36, 38, 40, 42, and 44. Base station 32 is usually connected to a continuous power supply (not shown) such that the power efficiency of base station 32 is not relevant. However, portable communications device 34 (and 36, 38, 40, 42, and 44 in a multi-point system) are usually powered by batteries which have a finite amount of power. Therefore, optimizing the power efficiency of the system, and particularly of the portable communications device(s), is important. Even so, such optimization must also allow for the communications system to operate effectively, i.e., to be able to send and/or receive signals without significant delay.

In one embodiment, base station 32 is bi-directional and portable communications devices 34, 36, 38, 40, 42 and 44 are receive only devices. Base station 32 includes a coordinating protocol which controls the operation of the portable communications devices. For example, base station 32 controls the duty cycle of the portable communications devices by placing one or more of the portable communications devices in a minimum power usage mode for a preprogrammed time. After the preprogrammed time, the portable communications device automatically returns to the standby mode awaiting another signal. The minimum power usage mode uses less power than the standby mode. By placing a portable communications devices into the minimum power usage mode, the power efficiency of that portable communications device is optimized.

The preprogrammed time may be variable. For example, if a particular portable communications device is required to be active very infrequently, the preprogrammed time is longer than for a portable communications device that is required to be used more frequently. This allows for the maximum efficiency in the power consumption of the system as a whole. Also, if a particular task is run less frequently, the preprogrammed time for a portable communications device on which that task is to be run may be longer than for a portable communications device on which a task that is run more frequently.

In another embodiment, portable communications devices 34, 36, 38, 40, 42, and 44 are also bi-directional. In this embodiment, base station 32 may put a portable communications device into minimum power mode for a preprogrammed time. However, because the portable communications device is bi-directional, after the preprogrammed time, the portable communications device may poll base station 32 to notify the base station that the portable communications device is once again in the standby mode. This allows base station 32 to transmit any signals which may have been queued up during the preprogrammed time.

Figure 5A:
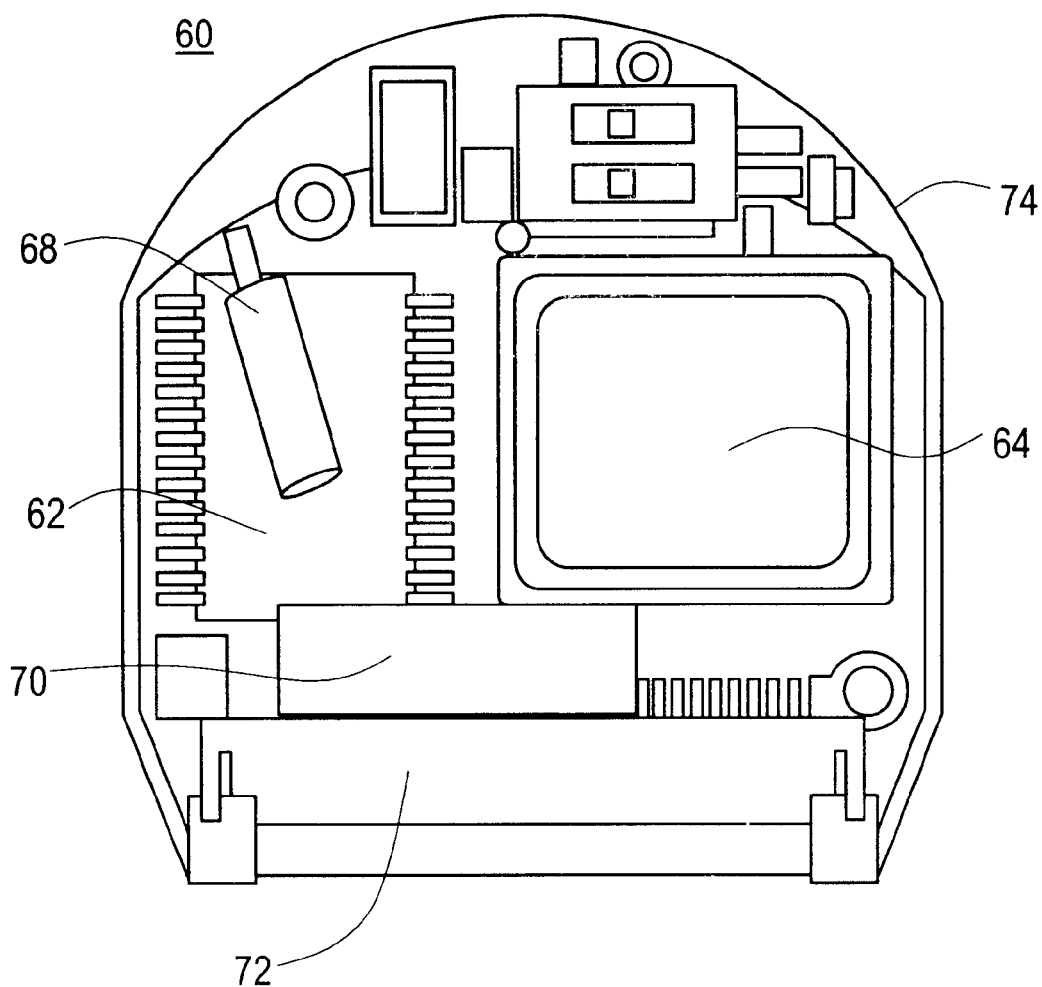
FIGS. 5A, 5B and 5C are block schematic diagrams of a self-contained computer according to the subject invention.
Figure 5B:
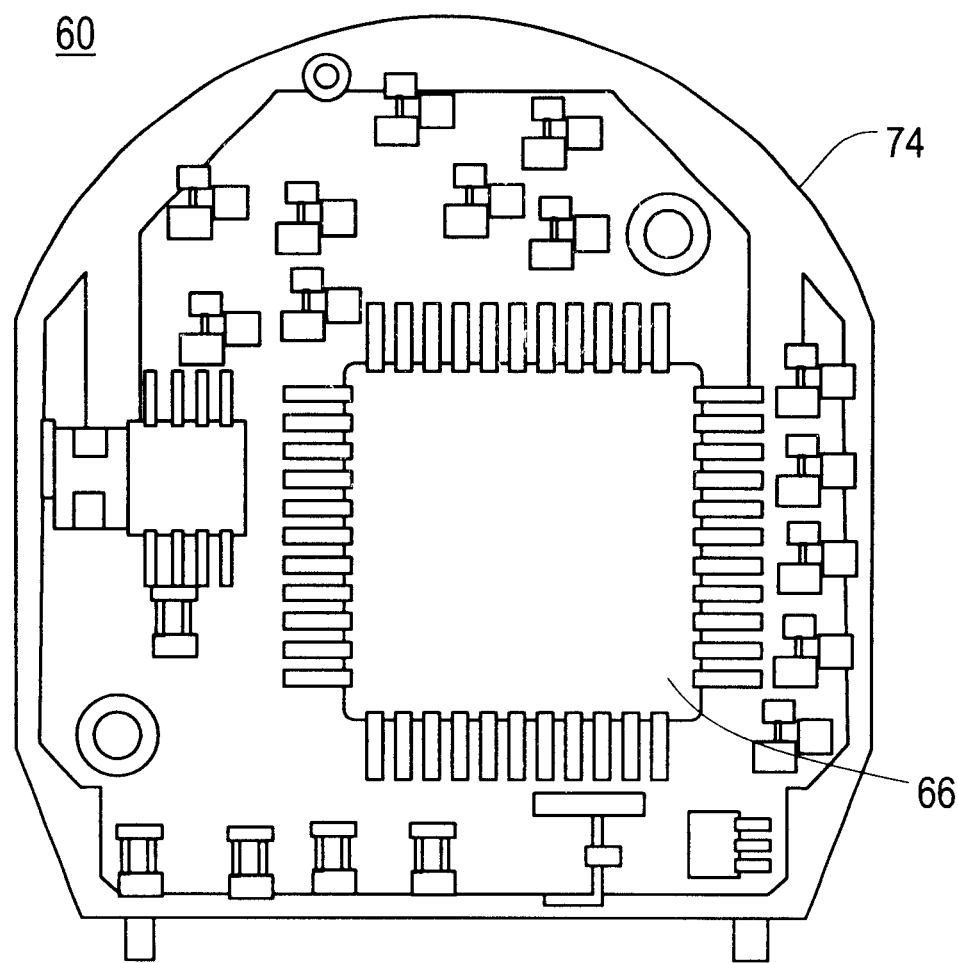
Figure 5C:
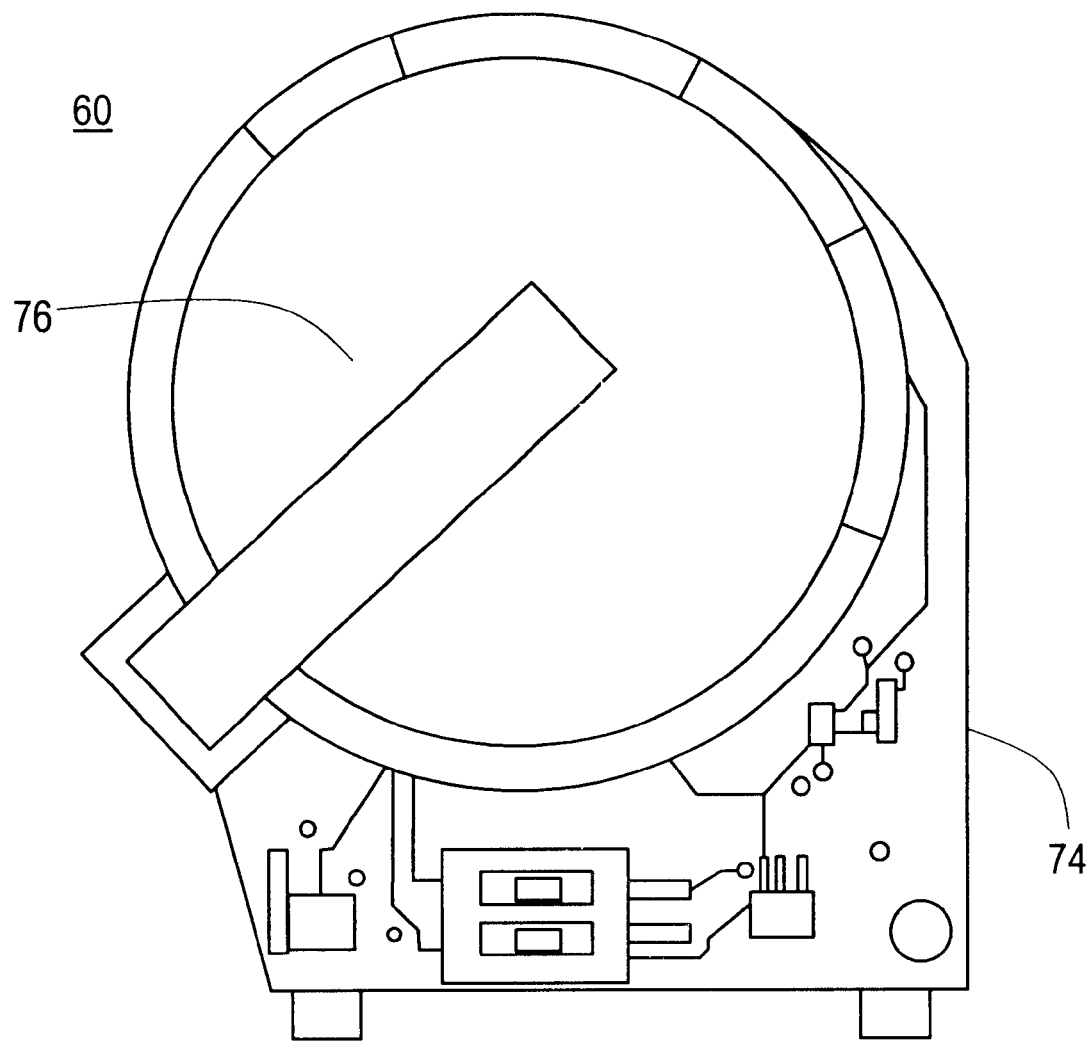

In another embodiment, computer 60, FIGS. 5A–5C, is a self-contained, miniaturized computer. Computer 60 includes first processing unit 62, RF transceiver 64, second processing unit 66 (FIG. 5B), low clock frequency crystal 68, high clock frequency crystal 70 and I/O connector 72 all mounted on circuit board 74. Power source 76, FIG. 5C, for example a battery, may be attached to circuit board 74.

The small size and low power consumption of computer 60 allows computer 60 to operate from battery 70 for its entire life span. In a preferred embodiment, first processing unit 62 operates at a clock frequency of 32 kHz, and second processing unit 66 operates at a clock frequency of 4 MHz. A coordinating protocol operates so that computer 60 may perform signal processing and RF transmission with optimum power efficiency. Such self-contained, miniaturized computers are useful in communications systems and locally networked computer systems.

Figure 4:
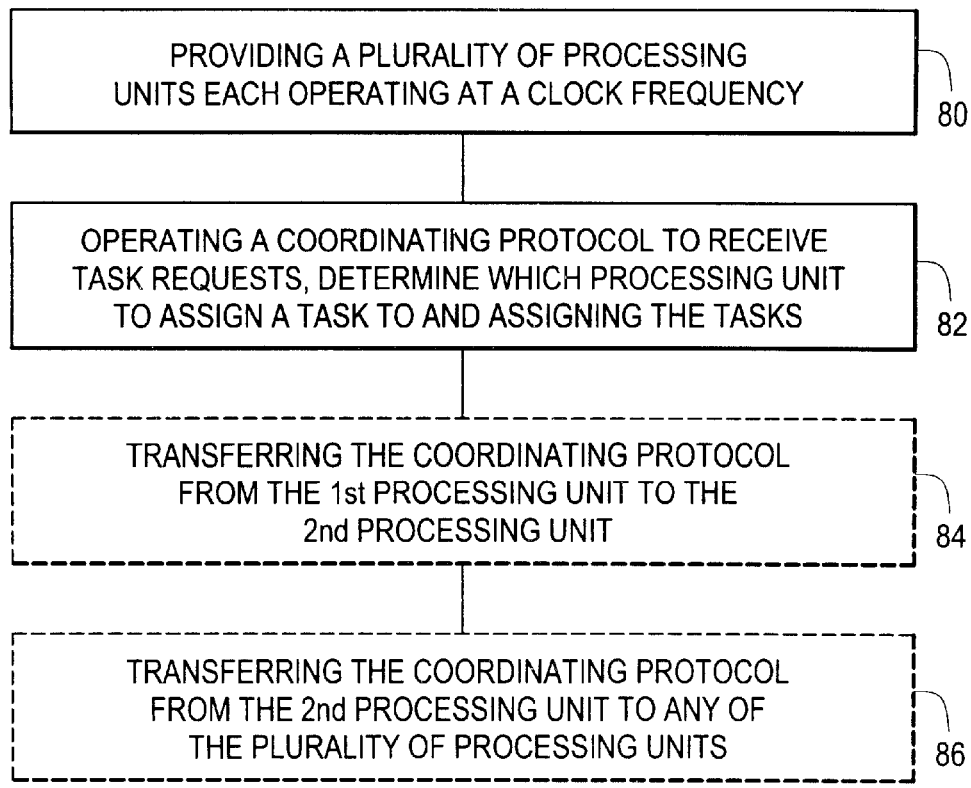
FIG. 4 is a block diagram of the method of the subject invention.

A method for optimizing the power efficiency of a multi-processor computer system is also provided. Step 80 of providing a plurality of processing units, FIG. 4, includes providing at least first and second processing units. Each of the processing units operates at a clock frequency. In a preferred embodiment, the clock frequencies of each of the plurality of processing units is different, although this is not a necessary limitation. Step 82 of operating a coordinating protocol on the first processing unit includes receiving a request to perform a task, determining to which processing unit to assign the task, and assigning the task to a processing unit. In a preferred embodiment, step 84 of transferring the coordinating protocol from the first processing unit to the second processing unit may be included. In a further embodiment, step 86 of transferring the coordinating protocol from the second processing unit to any of the plurality of processing units may be included. Optional steps 84 and 86 provide for transferring the coordinating protocol based on the speed required to operate the coordinating protocol. For example, if the number of task requested is high, a higher clock speed processing unit may be required to run the coordinating protocol.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A networked computing system comprising:
   a plurality of processing units including at least first and second processing units, said first processing unit running a coordinating protocol to control operation of the processing units in order to reduce power consumption of the system;
   wherein the first processing unit transfers the coordinating protocol to the second processing unit because the second processing unit can execute a function associated with the coordinating protocol; and
   wherein, after executing the function, the second processing unit transfers the coordinating protocol to a processing unit in the plurality of processing units that consumes a lowest amount of power when executing the coordinating protocol.

2. The networked computing system of claim 1, wherein the first and second processing units are physically interconnected.

3. The networked computing system of claim 2, wherein the first processing unit operates at a first clock frequency and the second processing unit operates at a second clock frequency, the second clock frequency being higher than the first clock frequency.

4. The networked computing system of claim 3, wherein the first processing unit assigns a task to the first processing unit or to the second processing unit based on a processing speed required by the task such that reduced power is used to perform the task.

5. The networked computing system of claim 3, wherein the first processing unit instructs the second processing unit to enter a reduced power usage mode.

6. The networked computing system of claim 5, wherein the first processing unit activates the second processing unit from the reduced power usage mode when a task is to be performed by the second processing unit.

7. The networked computing system of claim 1, wherein the first and second processing units are communications devices.

8. The networked computing system of claim 7, wherein the first processing unit instructs the second processing unit to enter a reduced power usage mode.

9. The networked computing system of claim 7, wherein the first and second processing units are bi-directional communications devices.

10. The networked computing system of claim 1, wherein the first processing unit coordinates operation of the second processing unit to reduce power consumption of the system.

11. The networked computing system of claim 10, wherein the first processing unit instructs the second processing unit to enter a reduced power consumption mode for a preprogrammed time.

12. The networked computing system of claim 11, wherein the second processing unit polls the first processing unit after the preprogrammed time.

13. The networked computing system of claim 11, wherein the preprogrammed time is variable.

14. The networked computer system of claim 1, wherein the function comprises assignment of tasks to the second processing unit.

15. The networked computer system of claim 1, wherein the first and second processing units have fixed clock frequencies, and wherein transfer of the coordinating protocol is based on the fixed clock frequencies.

16. A multiple processor computer system comprising:
   a plurality of processing units, each of the plurality of processing units operating at a clock frequency, with at least a first processing unit operating at a clock frequency that is lower than clock frequencies of others of the processing units;
   wherein the first processing unit coordinates operation of the processing units via a coordinating protocol so as to reduce power consumption of the computer system;
   wherein the first processing unit transfers the coordinating protocol to a second processing unit because the second processing unit can execute a function associated with the coordinating protocol; and
   wherein, after executing the function, the second processing unit transfers the coordinating protocol to a processing unit in the plurality of processing units that consumes a lower amount of power than the second processing unit when executing the coordinating protocol.

17. The multiple processor computer system of claim 16, wherein each of the plurality of processing units operates at a different clock frequency.

18. The multiple processor computer system of claim 16, wherein the second processing unit has a higher clock frequency than the first processing unit.

19. The multiple processor computer system of claim 16, wherein the function comprises assignment of tasks to others of the plurality of processing units.

20. The multiple processor computer system of claim 16, wherein the first and second processing units have fixed clock frequencies, and wherein transfer of the coordinating protocol is based on the fixed clock frequencies.

21. A method of reducing power consumption in a multi-processor computing system, the method comprising:
   operating a coordinating protocol on a first processing unit of a plurality of processing units, the coordinating protocol comprising:
      receiving a request to perform a task;
      determining to which of the plurality of processing units to assign the task; and
      assigning the task to one of the plurality of processing units; and
   transferring the coordinating protocol to a second processing unit of the plurality of processing units because the second processing unit can execute a function associated with the coordinating protocol;
   wherein, after executing the function, the second processing unit transfers the coordinating protocol to a processing unit in the plurality of processing units that consumes a lowest amount of power when executing the coordinating protocol.

22. The method of claim 21, wherein the coordinating protocol determines a processing unit to which a task is to be assigned based on which processing unit will result in a reduction of power in the multi-processor computing system.

23. The method of claim 21, wherein the function comprises an amount of tasks associated with the coordinating protocol.

24. The method of claim 23, wherein the second processing unit transfers the coordinating protocol to a processing unit having a lowest clock speed.

25. The method of claim 21, wherein the function comprises assignment of tasks to the one of the plurality of processing units.

26. The method of claim 21, wherein the plurality of processing units have fixed clock frequencies, and wherein transfer of the coordinating protocol is based on the fixed clock frequencies.

27. A computer system comprising:
   a plurality of processing units including first and second processing units, the first processing unit running a coordinating protocol operable to coordinate operation of the first and second processing units;
   a power source;
   a flash memory module; and
   a radio frequency (RF) transceiver,
   wherein the first processing unit assigns tasks to the first and second processing units to reduce power consumption of the system;
   wherein the first processing unit transfers the coordinating protocol to the second processing unit because the second processing unit can execute a function associated with the coordinating protocol; and
   wherein after executing the function, the second processing unit transfers the coordinating protocol to a processing unit in the plurality of processing units that consumes a lowest amount of power when executing the coordinating protocol.

28. The computer system of claim 27, wherein the first processing unit operates at a clock frequency of 32 kHz and the second processing unit operates at a clock frequency of 4 MHz.

29. The computer system of claim 28, wherein the power source comprises a battery.

30. The computer system of claim 27, wherein the second processing unit has a higher clock frequency than the first processing unit.

31. The computer system of claim 30, wherein the second processing unit transfers the coordinating protocol from the second processing unit back to the first processing unit.

32. The computer system of claim 27, wherein the function comprises assignment of tasks to the one of the plurality of processing units.

33. The computer system of claim 27, wherein the first and second processing units have fixed clock frequencies, and wherein transfer of the coordinating protocol is based on the fixed clock frequencies.

34. A computing system comprising:
   a plurality of processing units including at least first and second processing units, the first processing unit running a coordinating protocol to control operation of the processing units;
   wherein the first processing unit transfers the coordinating protocol to the second processing unit because the second processing unit can execute a function associated with the coordinating protocol; and
   wherein, after executing the function, the second processing unit transfers the coordinating protocol to a processing unit in the plurality of processing units that consumes a lower amount of power than the second processing unit when executing the coordinating protocol.

35. The computing system of claim 34, wherein the first and second processing units are physically interconnected.

36. The computing system of claim 34, wherein the first processing unit operates at a first clock frequency and the second processing unit operates at a second clock frequency, the second clock frequency being higher than the first clock frequency.

37. The computing system of claim 34, wherein the first processing unit assigns a task to the first processing unit or to the second processing unit based on a processing speed required by the task such that reduced power is used to perform the task.

38. The computing system of claim 34, wherein the first processing unit instructs the second processing unit to enter a reduced power usage mode.

39. The computing system of claim 34, wherein the first processing unit activates the second processing unit from the reduced power usage mode when a task is to be performed by the second processing unit.

40. The computer system of claim 34, wherein the first and second processing units have fixed clock frequencies, and wherein transfer of the coordinating protocol is based on the fixed clock frequencies.

41. The computing system of claim 34, wherein the first and second processing units are communications devices.

42. The computing system of claim 41, wherein the first processing unit coordinates operation of the second processing unit to reduce power consumption of the system.

43. The computing system of claim 42, wherein the first processing unit instructs the second processing unit to enter a reduced power usage mode.

44. The computing system of claim 34, wherein the first and second processing units are bi-directional communications devices.

45. The computing system of claim 34, wherein the first processing unit coordinates operation of the second processing unit to reduce power consumption of the system.

46. The computing system of claim 34, wherein the first processing unit instructs the second processing unit to enter a reduced power consumption mode for a preprogrammed time.

47. The computing system of claim 46, wherein the second processing unit polls the first processing unit after the preprogrammed time.

48. The computing system of claim 46, wherein the preprogrammed time is variable.

49. The computer system of claim 34, wherein the function comprises assignment of tasks to the one of the plurality of processing units.

50. A system comprising a plurality of communication devices, the plurality of communication devices comprising:
   a coordinating device that runs a coordinating protocol to control operation of other communication devices, the coordinating device having a lowest clock speed of the plurality of communication devices;
   a first communication device that operates in a standby mode to receive signals and in a sleep mode that consumes less power than the standby mode, the first communication device having a higher clock speed than the coordinating device;
   a second communication device that operates in the standby mode to receive signals and in the sleep mode that consumes less power than the standby mode, the second communication device having a higher clock speed than the first communication device;
   wherein the coordinating device controls the first communication device to enter the sleep mode for a first amount of time, and controls the second communication device to enter the sleep mode for a second amount of time, the first and second amounts of time being based on frequencies of operation of the first and second communication devices, respectively, the frequencies of operation being set by the coordinating protocol;
   wherein the coordinating device transfers the coordinating protocol to the second communication device to execute a function associated with the coordinating protocol that the coordinating device could not timely execute; and
   wherein, after executing the function, the second communication device transfers the coordinating protocol to a communication device based on an amount of power consumed by the communication device when executing the coordinating protocol.

* * * * *